United States Patent
Ward et al.

(10) Patent No.: US 6,567,986 B2
(45) Date of Patent: *May 20, 2003

(54) METHOD AND APPARATUS FOR DISTRIBUTING A GLOBALLY ACCURATE KNOWLEDGE OF TIME AND FREQUENCY TO A PLURALITY OF A HIGH DEFINITION TELEVISION STUDIOS

(75) Inventors: Christopher Ward, Glen Ridge, NJ (US); Charles M. Wine, Princeton, NJ (US)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/255,949

(22) Filed: Feb. 23, 1999

(65) Prior Publication Data

US 2002/0100064 A1 Jul. 25, 2002

Related U.S. Application Data

(60) Provisional application No. 60/077,717, filed on Mar. 12, 1998.

(51) Int. Cl.[7] .......................... H04N 7/173; H04N 9/475
(52) U.S. Cl. .......................... 725/118; 725/98; 348/512; 348/521; 348/722; 348/536
(58) Field of Search .................. 725/98, 118; 348/722, 348/536, 521, 512; 370/509, 510, 516, 503

(56) References Cited

U.S. PATENT DOCUMENTS 3,835,253 A * 9/1974 Bond .......................... 348/518
4,449,143 A * 5/1984 Dischert et al. ............ 348/441

(List continued on next page.)

FOREIGN PATENT DOCUMENTS

| DE | 37 22 260 A1 | 1/1989 | .......... H04N/17/00 |
| EP | 0 830 019 A2 | 9/1997 | ............ H04N/5/44 |
| EP | 0 830 019 A3 | 9/1997 | ............ H04N/5/44 |
| WO | WO 97/46024 | 12/1997 | ............ H04N/7/52 |

OTHER PUBLICATIONS

D.L. Mills, "On the Accuracy and Stability of Clocks Synchronized by the Network Time Protocol in the Internet System 1,2,3",ACM Computer Communication Review 20,1 (Jan. 1990).

D.L. Mills, "Network Time Synchronization", RFC 1129, Oct. 1989.

D.L. Mills, "Network Time Protocol (Version 3) Specification, Implementation and Analysis", Network Working Group, RFC 1305, Mar. 1992.

Primary Examiner—Andrew Faile
Assistant Examiner—Jason P Salce
(74) Attorney, Agent, or Firm—William J. Burke

(57) ABSTRACT

A method and apparatus for distributing time and frequency information to a plurality of studios such that the studios can then use the time and frequency information frequency and timelock their studio components to the global reference. The apparatus includes various embodiments for facilitating the distribution of time and frequency depending upon the type of digital network that is used for distributing the television signals.

23 Claims, 5 Drawing Sheets

U.S. PATENT DOCUMENTS

| | | | | |
|---|---|---|---|---|
| 4,525,685 | A | * | 6/1985 | Hesselberth et al. ........... 331/10 |
| 4,535,352 | A | * | 8/1985 | Haskell ................... 348/437.1 |
| 4,605,950 | A | * | 8/1986 | Goldeberg et al. ....... 348/389.1 |
| 4,689,683 | A | * | 8/1987 | Efron ......................... 348/705 |
| 4,888,641 | A | * | 12/1989 | Isnardi et al. .......... 375/240.25 |
| 5,010,403 | A | * | 4/1991 | Wardzala ................... 348/180 |
| 5,467,342 | A | * | 11/1995 | Logston et al. ............. 370/253 |
| 5,533,021 | A | * | 7/1996 | Brandstad et al. .......... 370/396 |
| 5,652,749 | A | * | 7/1997 | Davenport et al. ......... 370/466 |
| 5,742,599 | A | * | 4/1998 | Lin et al. ................... 370/395 |
| 5,757,416 | A | * | 5/1998 | Birch et al. ................. 370/474 |
| 5,812,749 | A | * | 9/1998 | Fernandez et al. .............. 714/4 |
| 5,828,414 | A | * | 10/1998 | Perkins et al. ......... 375/240.01 |
| 5,859,595 | A | * | 1/1999 | Yost ...................... 340/309.15 |
| 5,880,792 | A | * | 3/1999 | Ward et al. ................. 348/722 |
| 5,907,685 | A | * | 5/1999 | Douceur ..................... 709/248 |
| 5,917,830 | A | * | 6/1999 | Chen et al. ................. 348/473 |
| 5,966,387 | A | * | 10/1999 | Cloutier ..................... 370/516 |
| 6,020,931 | A | * | 2/2000 | Bilbrey et al. .............. 348/584 |
| 6,028,639 | A | * | 2/2000 | Bhatt et al. ................. 348/441 |
| 6,052,507 | A | * | 4/2000 | Niida et al. ................... 386/68 |
| 6,195,086 | B1 | * | 2/2001 | Perlman et al. .............. 345/1.1 |

\* cited by examiner

METHOD AND APPARATUS FOR DISTRIBUTING A GLOBALLY ACCURATE KNOWLEDGE OF TIME AND FREQUENCY TO A PLURALITY OF A HIGH DEFINITION TELEVISION STUDIOS

CROSS REFERENCE TO RELATED APPLICATION

This application claims benefit of U.S. Provisional Patent Application Ser. No. 60/077,717, filed Mar. 12, 1998, which is hereby incorporated by reference.

The invention relates to systems that distribute time information to multiple remote locations and, more particularly, the invention relates to a method and apparatus for distributing a time and frequency information to multiple remotely located high definition television studios.

BACKGROUND OF THE DISCLOSURE

A modern television studio contains a plurality of studio components that must be accurately time synchronized to facilitate switching between television signals produced by various sources within the studio. In a conventional NTSC system, the timing reference for both analog and digital signals within the studio are based on the notion of "system genlocks", in which all studio components are locked to a studio reference via a dedicated timing reference cable. As such, each and every component of an NTSC studio has a signaling cable as well as a genlock timing reference cable connected to it. Within a genlock system, frames of video information are moved synchronously between components. The genlock signal is instrumental in ensuring that frame synchronization is maintained between all the components of a studio. However, in a situation where data is passed between components using compressed digital formats, such as is used in high definition television (HDTV) broadcast studio, the genlock system is ineffective at maintaining synchronization between components with respect to the compressed digital signals.

In a HDTV studio, the various components within the studio are physically connected to each other through a central switch called a studio data router. This router is responsible for processing not only the video bitstreams that are coupled to the studio, but also to provide command and control services to the studio and any other services that are required by the studio. The low-level transport for data within the studio is asynchronous transfer mode (ATM) which is well suited for providing multiple data streams to a single point. Heretofore, there has not been developed a timing and frequency distribution system that would be equivalent to the system genlock of an NTSC studio for a HDTV studio. Since many studios share data and information through satellite communications and cable communication systems, it would be advantageous to have a global sense of time to be distributed not only to components within the studio, but also to all studios within a network such that retiming of signals at any studio location is not necessary prior to broadcast.

Therefore, a need exists in the art for a method and apparatus for distributing a global sense of time (and frequency) to a plurality of studios such that the studios can naturally time lock all of the studio components to the global time reference.

SUMMARY OF THE INVENTION

The disadvantages associated with the prior art are overcome by a method and apparatus for distributing a reference frequency and a reference time to a plurality of high definition television (HDTV) studios such that the studios can then use the reference frequency and time to lock their studio components to a global frequency and time reference. The invention includes various embodiments for facilitating the distribution of time and frequency depending upon the type of digital network that is used for distributing the television signals within a studio components within a studio. The first embodiment is useful in a system that uses a synchronous optical network (SONET) for distributing television signals to a plurality of studio components within a studio. This embodiment extracts a reference frequency signal from the SONET signals such that all the components in the studio that are equipped with this embodiment can be locked to the SONET frequency. Within this form of signal distribution, the SONET path and line overhead bytes can be used to distribute a global sense of time of day information to the studio components.

Another embodiment of the invention is a second method and apparatus for distributing a global sense of time of day information to multiple components within a studio. In this embodiment, the program clock reference within an MPEG transport stream is used for the distribution of time of day information to various studios and their studio components. Since MPEG transport streams are used in all forms of digital television information distribution, this embodiment is useful in SONET and non-SONET based distribution systems.

The last embodiment of the invention uses the internet engineering task force and network time protocol for distribution of time of day information to the studios and their respective components.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
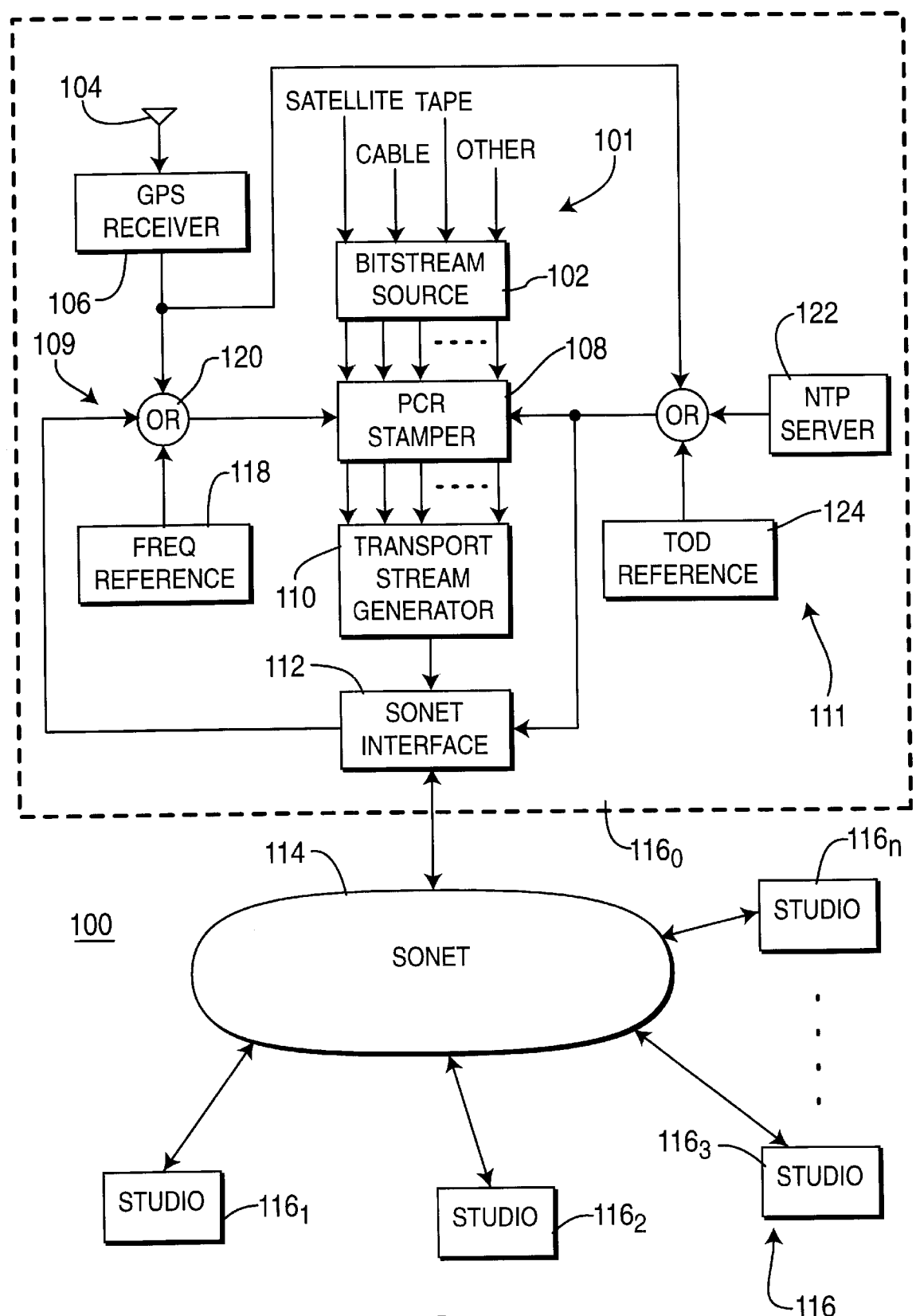
FIG. 1 depicts a digital television distribution system based upon a SONET network.

FIG. 1 depicts a block diagram of a digital television signal distribution system 100 that distributes digital television signals amongst a plurality of digital television studios $116_0$, $116_1$, $116_2$, ..., $116_n$ (hereinafter referred to collectively as 116). A portion 101 of one of the studios $116_0$ is depicted to illustrate one technique for distributing a global sense of time amongst a plurality of studios.

The digital television signal processed by a digital television studio 116 generally complies with the moving pictures expert group (MPEG) specification (ISO/IEC 13818). The signal is supplied a bitstream source 102 from a high definition television (HDTV) or digital television (DTV) studio 116. The bitstream source 102 generally takes the digital television signal from a plurality of remote sources such as from a satellite television network, cable television network or local sources such as a tape drive or DVD player, or a camera producing a digital bitstream directly from the studio or sporting event and the like. The signal or signals are processed within the studio and then may be transmitted to other studios, i.e., a digital network feed.

The bitstream source 102 processes those source streams to produce one or more MPEG compliant bitstreams that are coupled to a PCR stamper 108. The program clock reference (PCR) field within each data packet in an MPEG compliant bitstream is a 42 bit field composed of a program clock reference base of 33 bits and a program clock reference extension of 9 bits. The program clock reference base is in units of 1/300th of a system clock cycle, i.e., 1/90,000 of a second. Thus, the PCR is able to run for $2^{33} \times 1/90,000$ of a second, approximately 1.1 days before wrap around occurs.

PCR stamper 108 is coupled to a stable frequency reference 109 such as a global positioning system (GPS) receiver 106, SONET interface 112 or some other frequency reference 118. The OR gate 120 enables any one of these frequency sources to be coupled to the PCR stamper 108. PCR stamper 108 is also coupled to a stable time of day reference 111 such as a GPS receiver 106, Network Time Protocol Server 122 (discussed below with reference to FIG. 8) or some other time of day reference 124. Of course, an actual implementation of a studio may contain only one frequency and time of day reference. For example, to restamp a global sense of time into the PCRs of an MPEG bitstream, the GPS receiver 106 receives a global time reference through its antenna from the well-known satellite based GPS system. The time reference information (GMT time of day) from the GPS receiver is coupled through the OR gate 120 to the PCR stamper 108. The PCR stamper 108 restamps the PCR fields within each of the MPEG compliant bitstreams such that all the bitstreams contain the time of day generated by the GPS receiver (or any other time of day reference). As such, all of the restamped bitstreams carry the synchronous time of day signals. The bitstreams having the restamped PCR fields are coupled to a transport stream generator 110 which organizes (multiplexes) the various MPEG compliant bitstreams into a transport stream that is also MPEG compliant. The transport stream is then coupled from the transport stream generator 110 to a synchronous optical network (SONET) interface 112. The SONET interface couples the transport stream to a SONET network such that the stream is distributed to one or more HDTV studios $116_1$, $116_2$, $116_3$, ... $116_n$ (collectively 116) that will in turn broadcast the television program or programs that are carried by the transport stream. The SONET interface generates the SONET signals using a frequency reference of N×51.84 MHz such that all SONET signals within the SONET network carry the same frequency reference. For example, the OC-12 signal is 12×51.84 MHz.

The present invention ensures that the studios 116 receive a common frequency reference as well as common time of day information such that all of the studios 116 are locked to the same time of day information and frequency reference to facilitate processing and switching between MPEG streams without concern for local synchronization of the signals. Consequently, if each studio restamps the PCR fields of any programming that is being transmitted to another studio in the manner described above (i.e., using a global sense of time such as that provided by GPS), then all the studios will synchronously process the information.

Figure 2:
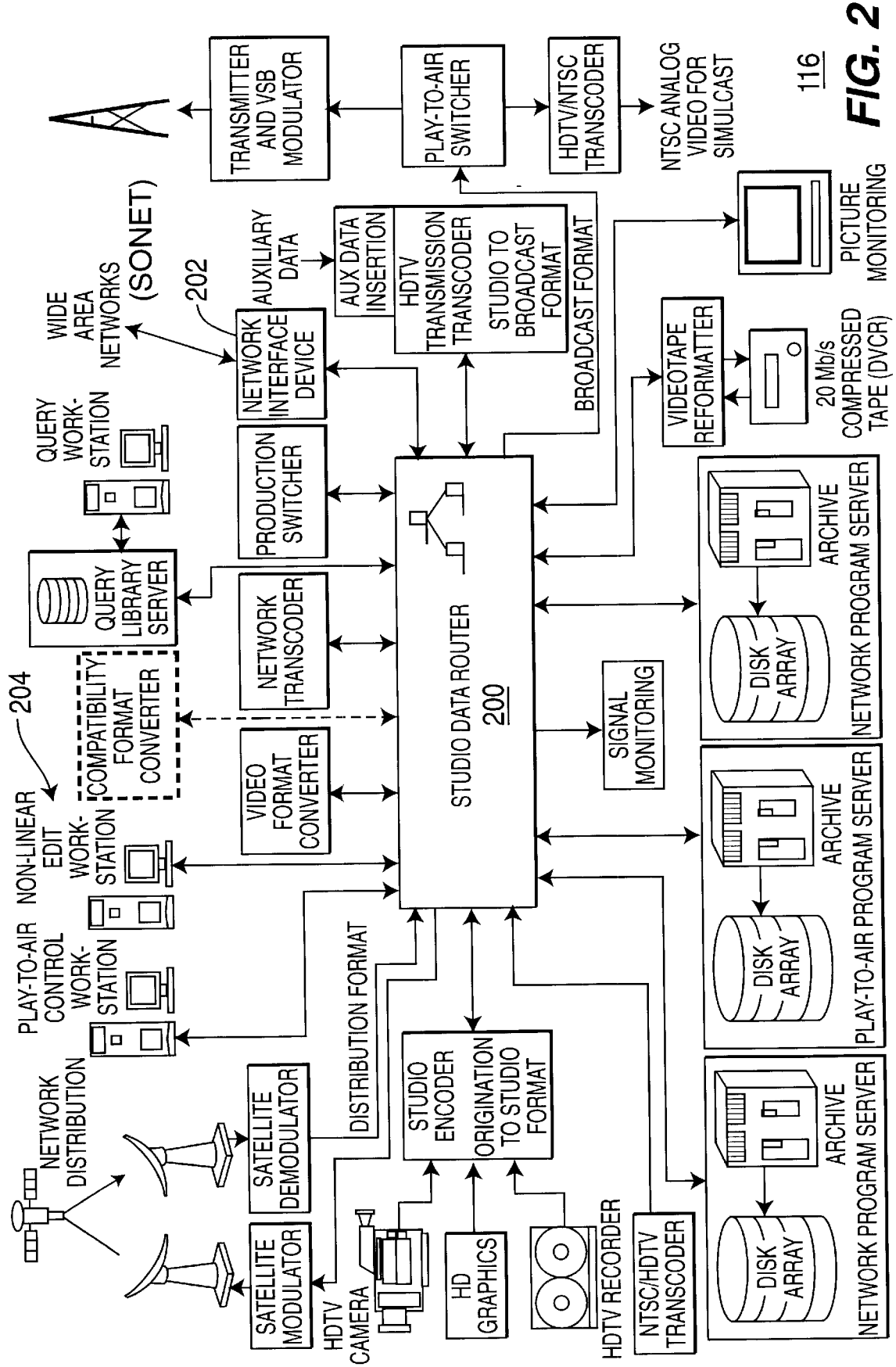
FIG. 2 depicts an illustration of a HDTV television studio.

FIG. 2 depicts a block diagram of an illustrative digital television studio 116. The studio has at its core, a studio data router 200 that couples data from any one component of the studio to any other component within the studio. The studio components 204 include encoders, program servers for supplying programming from a digital disk array, transcoders, video format converters, productions switches, auxiliary data sources, a high definition television transmitter, video tape sources and recorders, digital television monitors and the like. Within these components is also a network interface device 202 that couples the studio data router 200 to the SONET wide area network 114. Both the studio router 200 and the SONET wide area network 114 receive a common clock. Although SONET is illustratively used to distribute the digital television signals across a cable network, any other cable network that use a common frequency reference and that is capable of carrying MPEG transport streams would also suffice. The router 200 extracts time of day and frequency reference information from the network signals. The time of day and frequency reference information is then provided to the remaining studio components 204. Alternatively, each studio component may have circuitry that extracts the time of day and frequency reference information. In that instance, the router couples the time of day information and frequency information to the components without performing any extraction within the router. The apparatus for extracting this information either locally within the components or within the router is discussed below in reference to FIGS. 3–8.

More specifically, a studio router 200 performs stream splicing and switching such that various sources of digital television signals can be combined and spliced together for broadcast. Consequently, the splicing and switching processes require that the digital information be synchronously provided to the router 200 such that splicing will not produce any visible artifacts when the video stream is decoded within a viewer's television set. To ensure this synchronicity, a component 204 (any one of the studio components locally or the router itself) extracts time of day information and frequency information from the network signal such that all of the components within the studio can be locked to the same time of day and frequency information. Similarly all other studios (116 in FIG. 1) connected to the network are also locked to the same frequency and time of day such that any information coupled between the studios is also locked to the same frequency and time of day source.

Figure 3:
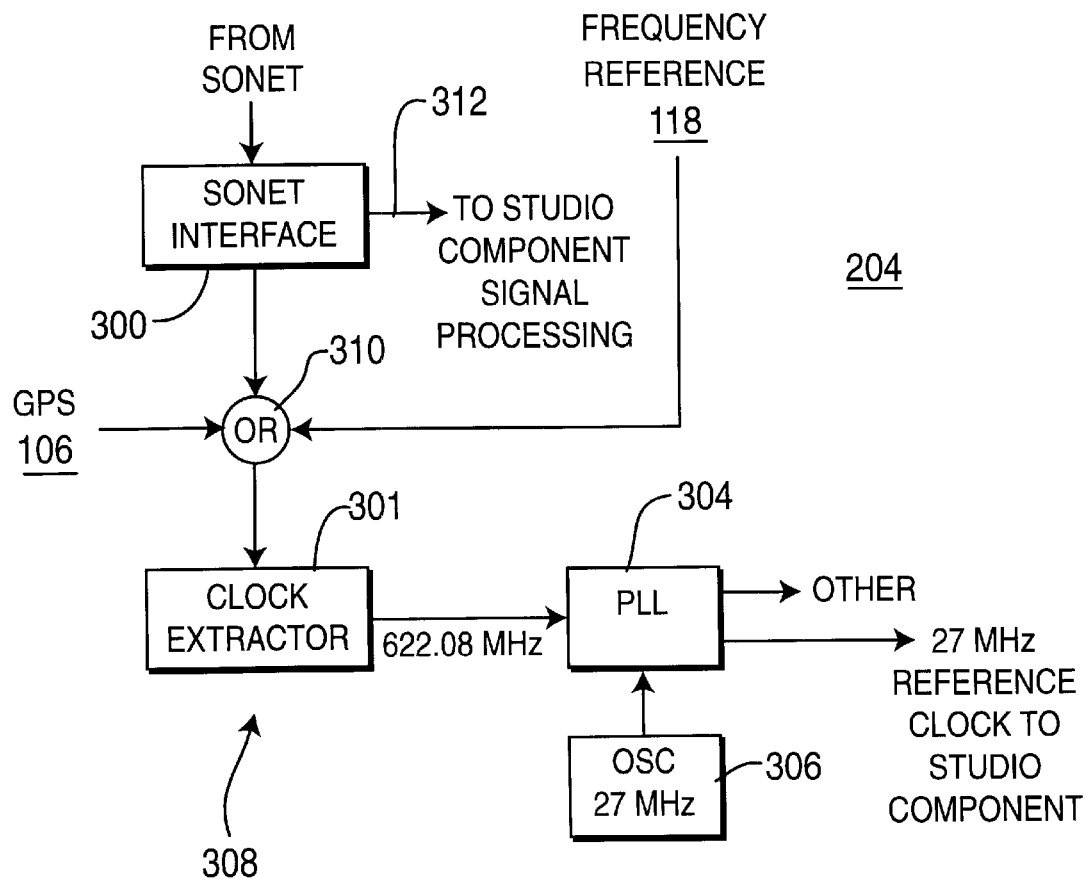
FIG. 3 depicts a block diagram of apparatus for extracting a reference frequency from a SONET signal for a studio component.

FIG. 3 depicts a block diagram of reference frequency generation circuitry 308 (reference clock generator) that is a portion of a studio component 204 that required a frequency reference. The frequency generator 308 comprises a SONET interface 300, a clock extractor 302, a phase lock loop (PLL) 304 and a local oscillator 306. In lieu of (or in addition to) a SONET-based reference, the circuitry 308 also has input ports that couple to other frequency reference sources such as GPS 106 or some other source 118. All the sources 300, 106, or 118 are coupled through an OR gate 310 to the clock extractor 302. The SONET interface 300 directly attaches to and receives input from a SONET-based router (200 in FIG. 2). The clock extractor 302 extracts the frequency information from the SONET signal. All other information (e.g., digital data) carried by SONET would be processed by the studio component and is output from the interface 300 on path 312. The free running SONET clock is defined as n×51.84 MHz+/−20 ppm (where n is an integer value). For delivery of 300 Mbps (mezzanine) compressed MPEG bitstream, an OC-12 interface of 622.08 MHz would be used. From the 622.08 MHz clock signal, a phase lock loop 304 uses the SONET clock signal as a reference signal and locks the local oscillator (27 MHz) to the reference signal. The 27 MHz local oscillator is based on the MPEG system level reference clock as described in the MPEG-2 specification. The system clock is required to be 27 MHz+/−810 Hz at the rate of frequency change the time of no more than $75 \times 10^{-3}$ Hz per second. The system clock (27 MHz) is related to the SONET clock (51.84 MHz) in a ratio of system clock times 25 divided by 48. The 27 MHz reference system clock is then distributed to the studio component that contains the circuitry 308.

In accordance with the present invention, the first embodiment to convey a global sense of time of day requires each studio component have a GPS receiver 106 to provide TOD and optionally its own reference clock generator 308 that is coupled to a commonly distributed 51.84 Mhz SONET clock reference, or some other frequency reference 118 through which multiple studio components can be frequency locked to one another. As such, each component generates its own local reference signal that may or may not be the 27 MHz system clock. As such, the PLL 304 has an "other" output that represents that the PLL 304 may be locked to a different local oscillator or may derive multiple frequencies for a given component where each of these frequencies is locked to the SONET clock signal.

Figure 4:
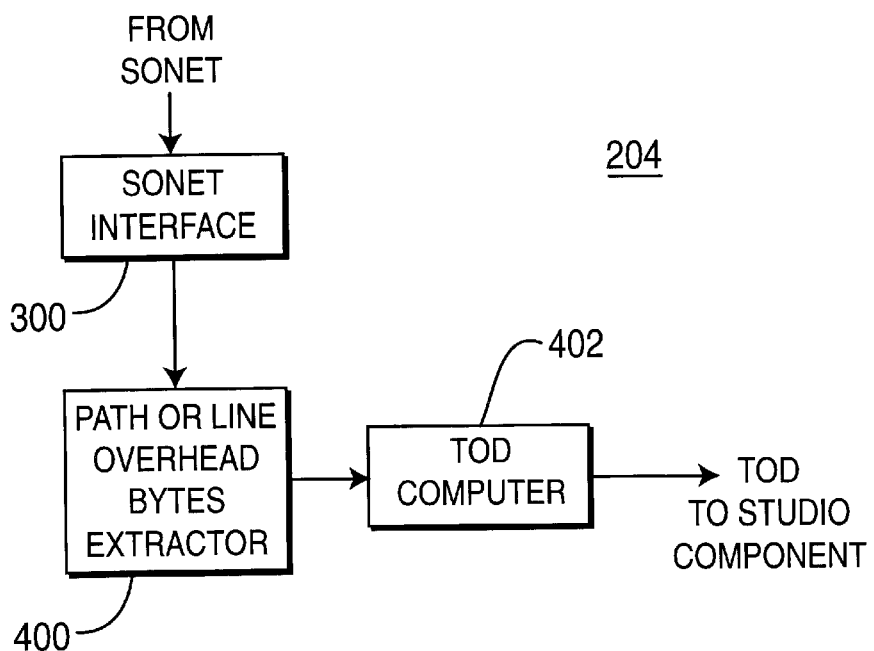
FIG. 4 depicts a block diagram of an apparatus for extracting a time of day signal from a SONET signal for a studio component.

FIG. 4 depicts a block diagram of a second embodiment of the present invention that generates and distributes a global sense of time of day within a studio using either the path or line overhead bytes within the SONET signal structure. SONET provides a digital multiplex format for the wide bandwidth of optical fiber cable. The SONET hierarchy provides a basic signal of 51.840 Mbps per second and a byte interleaved multiplex scheme that results in a family of digital rates and formats defined as a rate of N times 51.840 Mbps per second. The basic signal has a portion of its capacity dedicated to overhead, and the remaining portion carries payload. The basic modular signal within SONET is called STS-1 with 51.840 Mbps per second data rate. The STS-1 optical counterpart is called OC-1 (OC is optical carrier) and its rate is directly converted from STS-1 after frame synchronous scrambling.

Figure 5:
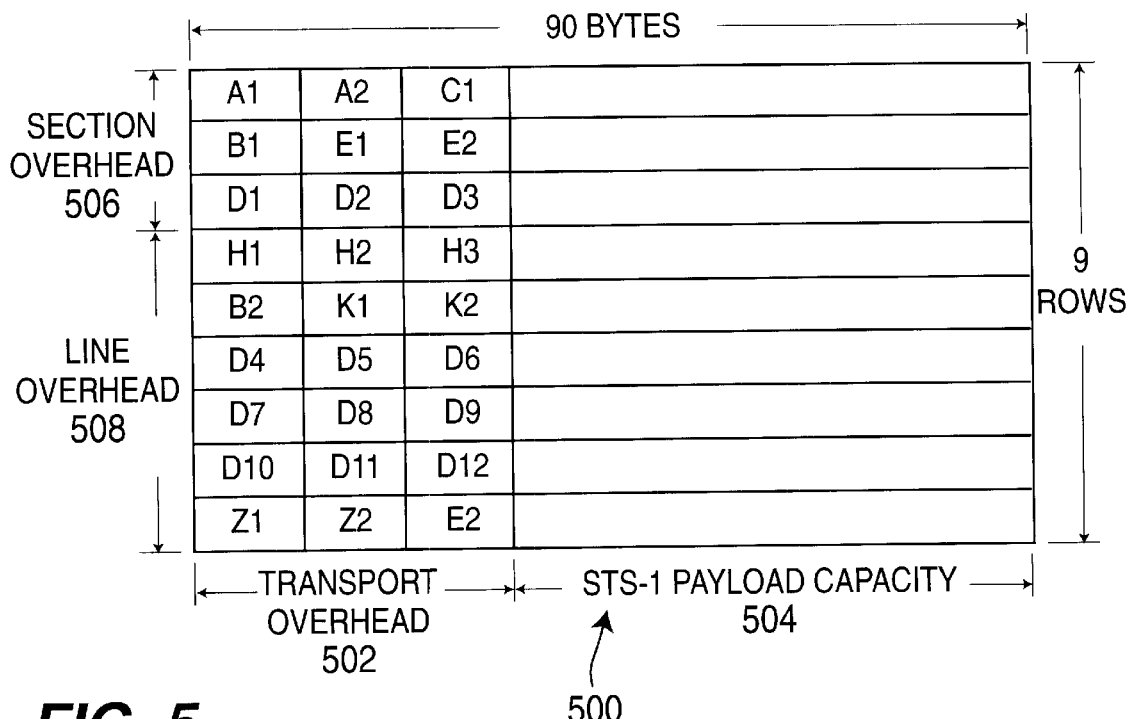
FIG. 5 depicts a SONET STS-1 frame.
Figure 6:
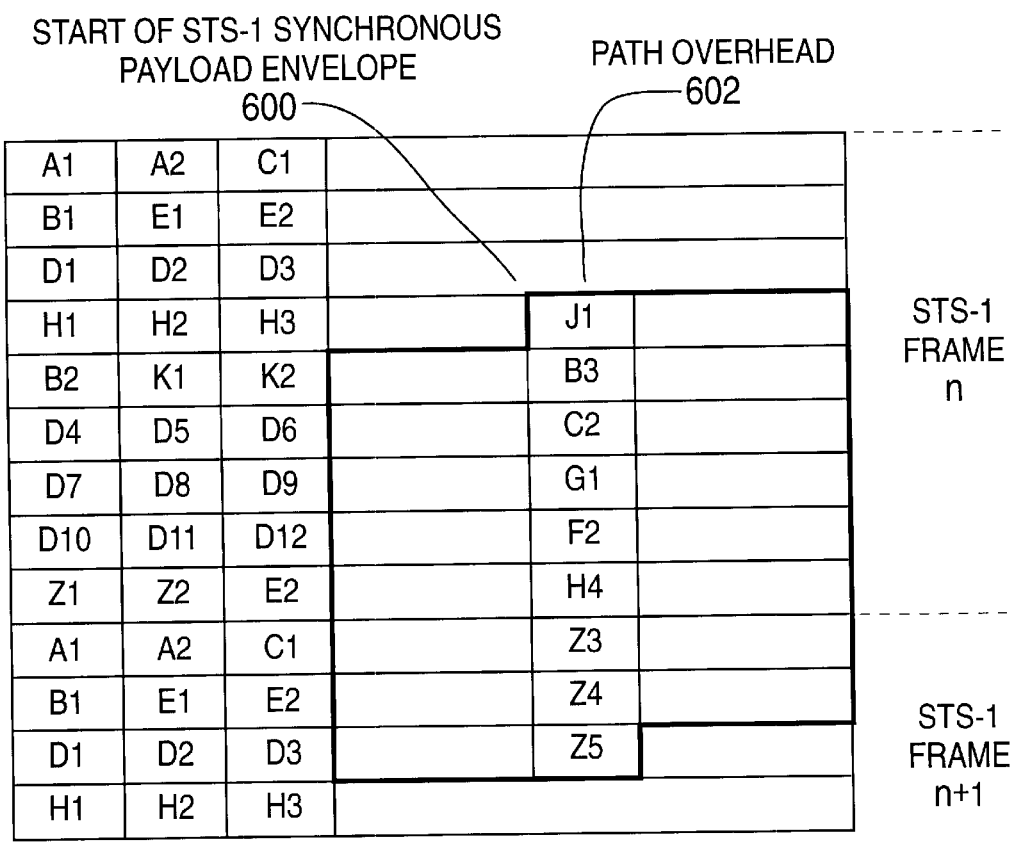
FIG. 6 depicts a SONET STS-1 synchronous payload envelope.

The STS-1 frame structure is depicted in FIG. 5. The frame structure 500 contains 90 columns and 9 rows of 8 bit bytes for a total of 810 bytes. With a frame length of 125 microseconds (derived from 8000 frames/second), STS-1 has a bit rate of 51.84 Mbps. The first three columns 502 are the transport overhead information that contains overhead bytes of sections and line layers. Of the 27 bytes in the transport overhead, 9 bytes are used for section overhead 506 (used between line terminating equipment to section terminating equipment and between section terminating equipment) and 18 bytes are used for line overhead 508 (used between line terminating equipment). The remaining bytes within the STS-1 frame form the payload capacity 504. Within the STS-1 payload capacity 504 floats a synchronous payload envelope (SPE) 600, depicted in FIG. 6. The start location of the SPE is pointed to by pointer fields in the line overhead (fields H1 and H2) and may span two STS-1 frames. The SPE 600 contains a column of overhead called the path overhead 602 (used between path terminating equipment). Within the section, line and path overhead bytes is a provision within the SONET protocol to pass user data. Specifically the following fields are available for use with user data:

| | |
|---|---|
| E1 | Section Orderwire |
| F1 | Section User |
| D1-D3 | Section Data Com |
| D4-D12 | Line Data Com |
| E2 | Line Orderwire |
| F2 | User Channel |

The present invention uses these SONET user data fields for accurate conveyance of time of day to studio components. FIG. 4 depicts a block diagram of components that are used for extracting time of day information from the user data fields of a SONET signal carried by the path or line overhead bytes. The embodiment of the invention depicted in FIG. 4 forms a portion of a network interface device within a studio component that requires synchronous time of day information. The device 202 comprises a SONET interface 300 for interfacing with the SONET network and extracting information on the SONET network that is addressed to a particular studio component. The path or line overhead bytes extractor 400 removes user data information from the transport overhead portion of the STS-1 frame structure. The user data contains encoded time of day information. The time of day (TOD) computer 402 converts the user data into a local time of day for use by the studio. As such, the studio component receives a local time of day that is synchronized to a global time of day. The user data can include the time of day in an encoded format so that it does not require a significant number of bits to encode and transmit.

Recognizing that the time of day services are provided by the router 200 at FIG. 2, and that the router is directly connected to all studio components (possibly with a repeater between those components), it is expected that the most appropriate user data are those at the line overhead layer, i.e., either Line Data Com or Line Orderwire.

Figure 7:
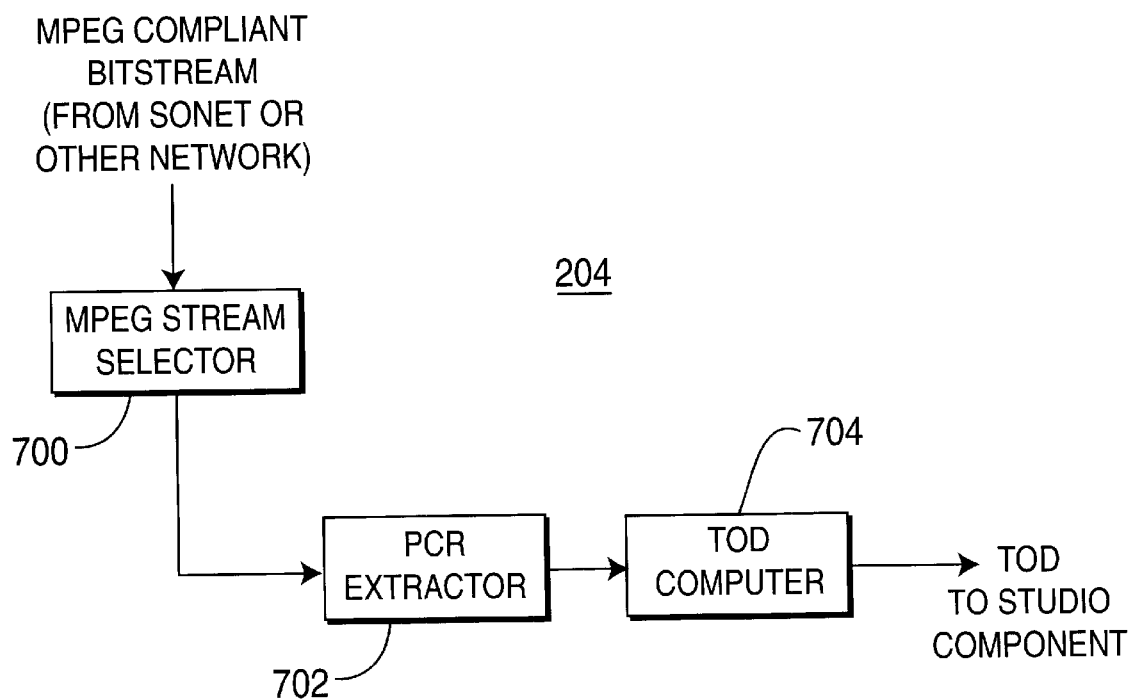
FIG. 7 depicts a block diagram of an apparatus for extracting time of day information from an MPEG compliant bitstream.

FIG. 7 depicts a block diagram of a third embodiment of the invention wherein the program clock reference (PCR) of an MPEG compliant transport stream is used to transmit a global sense of time to various studio components. This technique does not rely upon any of the SONET protocol features such that any information distribution network can be used for distributing the MPEG compliant transport streams within the studio. So long as an MPEG compliant bitstream carrying a restamped PCR is available, the invention extracts the time of day information from the PCR field. The invention is incorporated into a network interface device of any studio component 204 requiring synchronous time of day information. The value of the PCR is assumed to have been exactly zero at 00:00.0 GMT on Jan. 1, 1970 and have been incremented continually since that time. Thus, every MPEG compliant bitstream contains periodically distributed PCR fields within the data packets to maintain TOD and timing synchronization of the decoded video and audio signals. The invention contains an MPEG stream selector 700, a PCR extractor 702, and a TOD computer 704. Assuming that all of the PCR fields have been restamped with a GPS time of day signal in a manner such as that discussed with reference to FIG. 1, the MPEG stream selector 700 selects the appropriate stream within the transport stream structure for use by the studio components. The selected stream is further processed by the PCR extractor 702 to extract the program clock reference field information. The PCR field is a 42 bit field composed of a program clock reference base of 33 bits and a program clock reference extension of 9 bits. The extractor 702 couples the PCR field data to the TOD computer 704 wherein a time of day is computed from the PCR field data.

Video events, such as switching from one stream to another, occur on boundaries that are expressible as values of the system time. Every switchable unit (splice point or segment) has a duration that is a multiple of 30 Hz, 29.97 Hz or 24 Hz. For example, assume that at the start of some sequence the system clock is 0 and that two short clips are to be played one after the other. The first clip is a movie clip at 24 Hz that contains 240 frames or 270,000,000 ticks of the system clock. At its conclusion the system clock would be at 270,000,000. If this were followed by a 90 frame clip of 29.97 Hz video that is 81,810,00 ticks of the system clock, the system time at the end of both sequences will have advanced 351,810,00. In fact, the granularity of all video segments and concatenated video segments is an integral number of thousands of system clocks ticks.

Whenever start and stop times are specified in the studio which do not correspond to an exact frame boundary, the next frame boundary after the specified time is used, e.g., if the intention were to start the evening news at 6:00 PM Tuesday, and the translation of 6:00 PM to system clock count came out to be 123,456,789,012 and if the previous stream was a 30 Hz stream with splice points every 900,000 ticks, then the first slice point past that time must be between 123,456,790,000 and 123,547,000,000. The exact value would depend on the PCR value that corresponds to frame boundary for the 30 Hz stream where a splice point is located.

The invention distributes a global sense of time to ensure that splicing and switching from stream to stream occurs exactly at the appropriate time from studio component to studio component. Such global time distribution is instrumental in creating a system wide synchronized timing arrangement.

Figure 8:
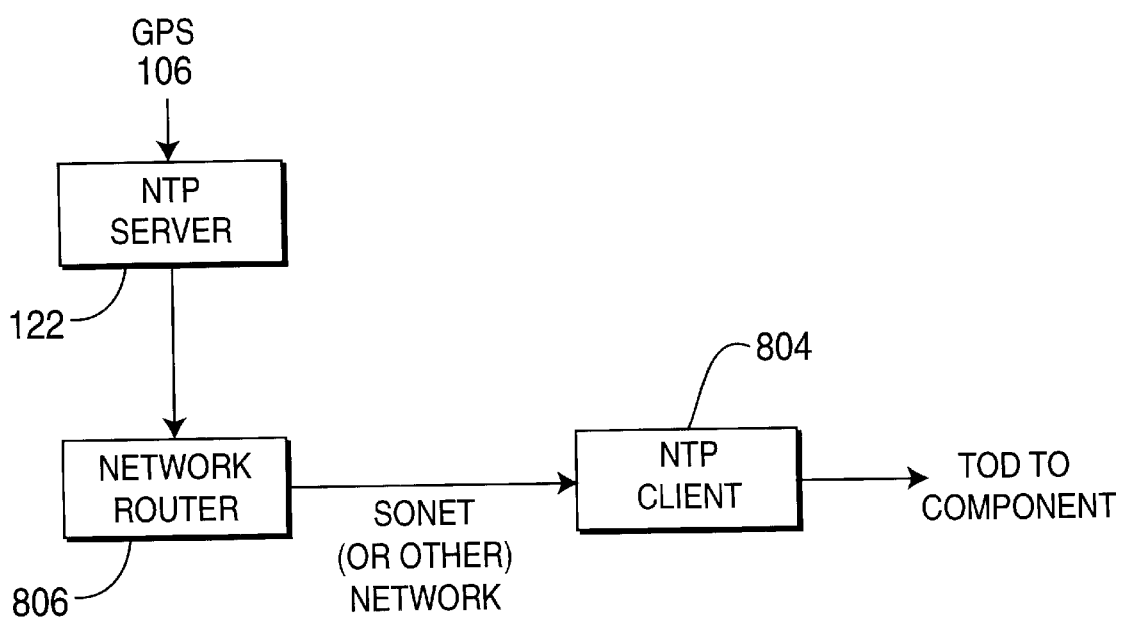
FIG. 8 depicts a block diagram for extracting time of day information from the internet engineering task force network time protocol.

The fourth and last embodiment of the invention for distributing time within a HDTV studio obtains the time of day by using the Internet Engineering Task Force (IETF) Network Time Protocol (NTP) protocol as shown in FIG. 8. This protocol makes use of NTP client protocol entities (NTP client 804) running on the participating studio components which exchange time of day messages with an NTP server 122 to adjust their internal clocks to maintain an accurate measurement of time of day. As such, a local sense of time, such as provided by a GPS receiver 106, can be formatted by the NTP server 122 and routed to the studio components NTP through an NTP network router 806. The router 806 may distribute the NTP signals via any form of network, SONET, ETHERNET or other type. Details of the NTP protocol may be found in IETF Request for Comments (RFC) 1305, Mills, D., "Network Time Protocol (Version 3) Specification Implementation and Analysis", RFC 1305, 1992.

Although various embodiments which incorporate the teachings of the present invention have been shown and described in detail herein, those skilled in the art can readily devise many other varied embodiments that still incorporate these teachings.

What is claimed is:

1. Apparatus for distributing a global sense of time to a plurality of remote HDTV studios comprising:

a time of day information processor for inserting time of day information into a digital signal that is transmitted to a plurality of HDTV studios;

a time of day extractor for extracting the time of day information from the digital signal; and a time of day distributor for distributing the time of day to at least one component within each HDTV studio.

2. The apparatus of claim 1 wherein said time of day information processor is a PCR restamper that encodes time of day information in a PCR field of an MPEG compliant bitstream.

3. The apparatus of claim 2 wherein the time of day extractor comprises:

an MPEG stream selector;

a PCR field information extractor; and a time of day computer.

4. The apparatus of claim 1 wherein said signal is distributed to the HDTV studios using SONET and said time of day information processor comprises:

means for inserting time of day information into an overhead bytes of a SONET signal.

5. The apparatus of claim 1 wherein said time of day extractor further comprises:

a SONET interface;

an overhead byte extractor;

a time of day computer.

6. The apparatus of claim 1 wherein said overhead bytes are either the path overhead byte or the line overhead byte.

7. The apparatus of claim 4 further comprising a frequency extractor for extracting frequency information from a SONET signal.

8. The apparatus of claim 7 wherein said frequency extractor comprises:

a SONET interface;

a clock extractor; and a phase lock loop for locking an HDTV studio clock to a SONET clock reference.

9. The apparatus of claim 1 wherein said time of day distributor is a data router.

10. The apparatus of claim 1 wherein said time of day information processor is a Network Time Protocol server and said time of day extractor is an Network Time Protocol client.

11. A method for distributing a global sense of time to a plurality of remote HDTV studios comprising the steps of:

inserting time of day information into a signal that is transmitted to a plurality of HDTV studios;

extracting the time of day information from the signal; and distributing the time of day to a plurality of components within each HDTV studio.

12. The method of claim 11 wherein said inserting step encodes time of day information in a PCR field of an MPEG compliant bitstream.

13. The method of claim 12 wherein said extracting step comprises the steps of:

selecting an MPEG stream;

extracting the PCR field information; and computing from the PCR field information a time of day.

14. The method of claim 11 wherein said signal is distributed to the HDTV studios using SONET and said inserting step comprises the step of:

inserting time of day information into an overhead bytes of a SONET signal.

15. The method of claim 11 wherein said time of day extracting step further comprises the steps of:
   extracting an overhead byte from the SONET signal;
   computing a time of day from the overhead byte.

16. The method of claim 11 wherein said overhead bytes are either the path overhead byte or the line overhead byte.

17. The method of claim 14 further comprising the step of extracting frequency information from a SONET signal.

18. The method of claim 17 wherein said frequency extracting step comprises the steps of:
   extracting a clock signal;
   phase locking an HDTV studio clock to a SONET clock reference.

19. The method of claim 11 wherein said inserting step encodes time of day information using the Network Time Protocol.

20. The method of claim 11 wherein said inserting step encodes time of day information using a GPS signal.

21. A method of distributing a reference frequency to a plurality of studio components in a plurality of HDTV studios an HDTV studio comprising the steps of:
   extracting frequency reference; and
   phase locking an HDTV studio component clock signal to said frequency reference in each of said plurality of HDTV studios.

22. The method of claim 21 wherein said frequency reference is carried by a SONET clock reference signal.

23. The method of claim 21 wherein said frequency reference is carried by a GPS signal.

* * * * *